Figure 1:
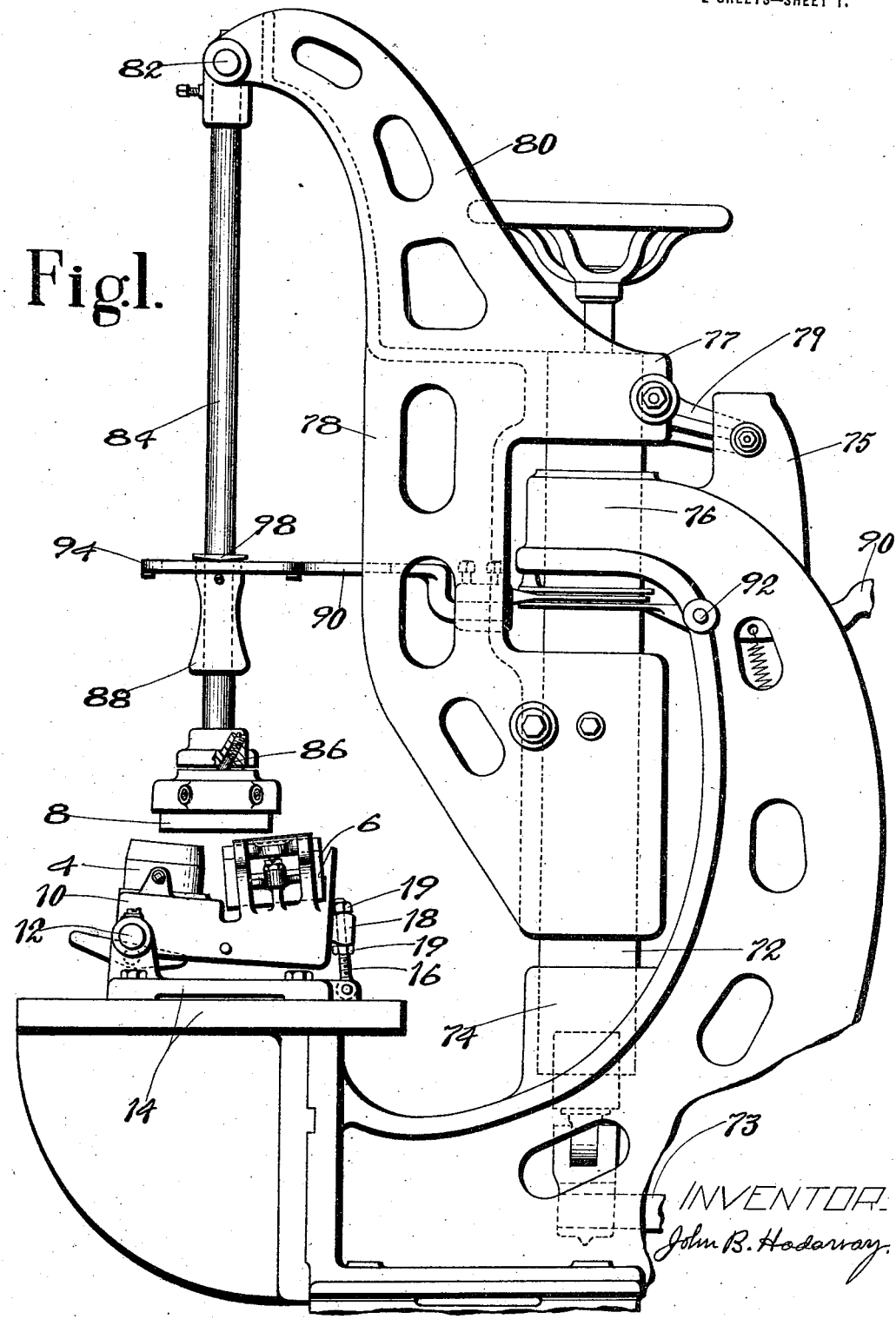

UNITED STATES PATENT OFFICE.

JOHN B. HADAWAY, OF SWAMPSCOTT, MASSACHUSETTS, ASSIGNOR TO UNITED SHOE MACHINERY CORPORATION, OF PATERSON, NEW JERSEY, A CORPORATION OF NEW JERSEY.

CUTTING MACHINE.

1,416,707.  Specification of Letters Patent.  Patented May 23, 1922.

Application filed September 8, 1919. Serial No. 322,446.

*To all whom it may concern:*

Be it known that I, JOHN B. HADAWAY, a citizen of the United States, residing at Swampscott, in the county of Essex and State of Massachusetts, have invented certain Improvements in Cutting Machines, of which the following description, in connection with the accompanying drawings, is a specification, like reference characters on the drawings indicating like parts in the several figures.

This invention relates to cutting machines and particularly to machines for cutting blanks from sheet material.

In accordance with a well-known method of making heel lifts, pieces of leather which constitute the scrap or waste from certain blank cutting operations are utilized in the manufacture of pieced heel lifts. Since the pieces of scrap are of various shapes and sizes and present characteristically numerous concaved and convexly curved edges complemental to the curved portions of the shoe bottom parts cut from the original sheet material, the pieces of scrap are first straight-edged by suitable cutting means, and are then successively placed over a heel lift die with the straight edge intersecting the cutting edge of the die at two points. Ordinarily a selected piece of scrap is straight-edged and is then positioned as described and forced into the die by suitable means to form a part of a lift. Another or other pieces are similarly straight-edged and positioned so as to complete the lift when forced into the die. Heretofore the proper positioning of the material with respect to the straight-edging means has depended upon the care and skill of the operator and, more particularly, upon his sight and the muscular control of his hand. Clearly the results will vary greatly with different operators and with the same operator during different portions of the working day.

It is an object of the invention to provide work positioning means in connection with straight edging means so that material may be cut rapidly and uniformly to the best advantage.

In one aspect the invention resides in the provision of work positioning means located closely adjacent to and intermediate between the ends of a cutting means for straight-edging work, and so constructed and arranged as to present no obstruction to cutting operations, and operative to gage the work by contact with a relatively small part of an edge portion thereof in such manner that other portions of the work may extend beyond the cutting means and beyond the gage.

Conveniently a power operated presser member or cutter block is used to force the material upon the straight-edge cutter and, subsequently, into the die, the construction being preferably such that the presser member may be moved from a position at one side of the cutters into positions to co-operate selectively with the straight edge cutter and die and novel means are provided to assist the operator in positioning the presser member over each cutter, thereby securing rapidity and certainty in cutting operations.

In another aspect the invention contemplates the provision of means for retaining the presser member or cutter block yieldingly in inoperative position at one side of the cutter or cutters so that the latter are open to inspection and to the free manipulation of work thereover.

In still another aspect the invention comprises the combination with a laterally movable presser member of means for yieldingly retaining the presser member in position to cooperate with a selected cutter, the advantages of such a construction residing principally in the fact that while the presser member may be readily moved to other operative positions it is retained, speaking with reference to the trained muscular sense of the operator, in the most effective cutting position directly over the selected cutter.

Other objects and advantages of the invention will be apparent from the following detailed description and will be pointed out in the claims.

Figure 2:
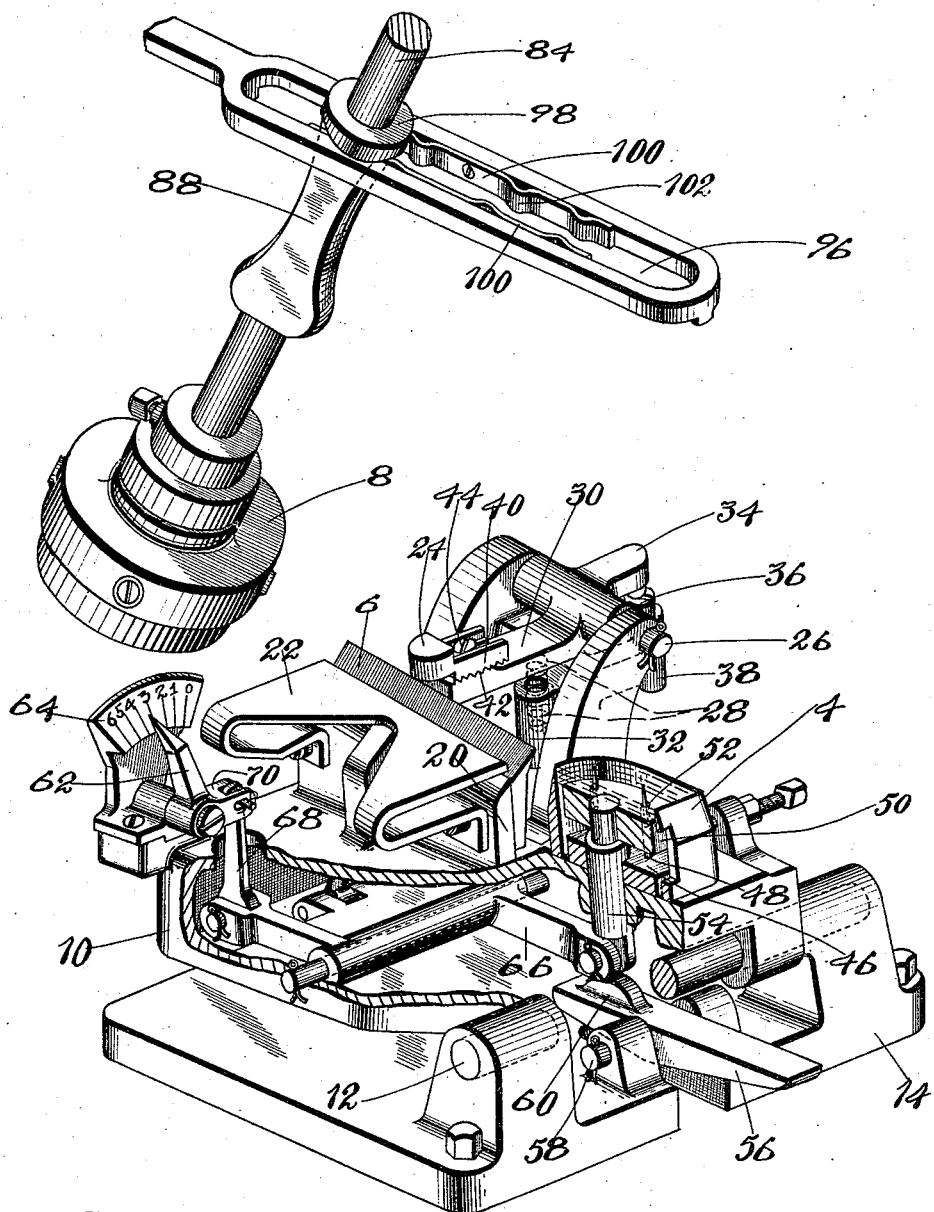

In the drawings;

Fig. 1 is a side elevation, partly broken away, illustrating one embodiment of my invention, and Fig. 2 is a detail view, partly in section, of the co-operating cutting instrumentalities.

In the construction shown a die 4 and a straight-edged cutter 6 are arranged for co-operation with a presser member or cutter block 8, the latter being so mounted that it may be brought into co-operative relation with either the die or the knife.

In the practice of a well-known method of forming pieced heel lifts, pieces of scrap leather are first straight edged by being forced upon the knife or cutter 6 through the use of the cutter block 8 and thereafter the prepared piece is placed with its straight edge intersecting opposite edges of the die 4 and is cut into the die upon a pressure applying operation of the same cutter block 8. However, so far as certain of the main features of applicant's invention are concerned, one or more cutters of the type of the die 4 may be substituted for the straight-edged cutter like that shown at 6, in which case the cutter block will be caused to co-operate with any one of the dies to form whole lifts or sections of lifts from leather, leather-board or other sheet material. Preferably the cutters are mounted upon a support 10 which is pivoted at 12 upon a table 14 in such manner that the cutters may be adjusted angularly with respect to the table to locate the plane of the cutting edge of each cutter parallel with the plane of the cutting surface of the cutter block when the latter is positioned directly over the selected cutter. Adjustment of the support 10 is provided by any well-known means, that shown consisting of a threaded member 16 arranged to pass through a projection 18 on the support to be adjustably secured by nuts 19 so that the support may be raised and lowered as described. Inasmuch as much greater force must be employed in cutting the material into the die 4, the latter is located adjacent to the pivotal point of the support while the cutter 6 is located to the rear of the die and preferably slightly to one side so as to be accessible to the operator.

While the cutter 6 may be secured to its support in any well-known manner, it is preferably bolted to an extension 20 on the support so that it may be removed to be sharpened or replaced as occasion may require. Carried by the same supporting projection 20 is a yielding work supporting member 22 arranged closely adjacent to the cutter, the function of which is to support a piece of material and enable the operator readily to recover the same after a cutting operation.

The material which is ordinarily used in the production of pieced lifts is leather scrap which remains after soles and heel lifts have been cut from leather stock, so that the pieces ordinarily present edges which are concaved and convexly curved in outline complemental of the curved edges of the soles and lifts. Hence it is desirable to provide gaging means to assist the operator in positioning the material with respect to the straight edge of the knife 6. This gaging means is preferably of the form shown at 24 in Fig. 2 of the drawings and is located closely adjacent to, and intermediate of the ends of, the knife. By being thus located it assists greatly in so positioning the material as to utilize the same to the maximum extent. Ordinarily the edge of the scrap leather at the deepest point of the concavity will be pressed against the gage 24 and then the piece will be forced upon the knife by means of the cutter block 8. Upon the descent of the latter the gage which is pivoted at 26 moves downwardly with the material and thus offers no obstruction to the cutting operation. Means is provided for returning the gage to its position of rest, the said means comprising preferably a spring 28 arranged to engage the lower surface of the gage support 30, said spring being preferably guided in a socket provided in a member 32 mounted on or integral with the support 10. In order to determine the uppermost position of the gage its support 30 is provided with an extension 34 having a portion arranged to engage with a set screw 36 carried in an arm 38 projecting from the member 32. Preferably the gage 24 is adjustably mounted on its support 30 by means which, in the construction shown, comprises a plate 40 having corrugations 42 to co-operate with corresponding corrugations on the plate 30 in securely holding the plate in adjusted position on the support 30, the attaching means comprising further a bolt and slot connection, the bolt being shown at 44. By means of this adjustment the gage may be secured in desired relation to the knife as, for example, in assembling the mechanism or when the size or style of the knife is changed. In case a piece of material having an edge other than a concave edge like that referred to above is to be presented to the knife 6 for a cutting operation, it may be presented against the vertical edge of the gage 24 providing it has a suitable edge portion. In other cases, that is, when the gage cannot be used, the piece of material will be placed with its edge overlapping or resting on top of the gage 24 and then when the cutter block 8 is operated the gage will descend and permit the piece to be cut by the knife in the usual manner.

In connection with the die 4 there is provided means for securing the lifts together in order that they may not be relatively displaced when removed from the die and in order to form a section of a heel which later may be used in building up a complete heel, usually by the addition of a heel lift of leather to form the tread surface of the heel, and another section, in many cases of leatherboard, to assist in holding the pieced lifts securely in the completed heel. The means referred to comprises a plate 46 disposed within the die 4 and carrying plungers or drivers 48 which project into openings in another plate 50 disposed above the first-mentioned plate within the die 4. At the beginning of operations the plate 50 is so disposed that its upper surface is in a plane corresponding substantially to that defined by the edge of the die. While in this position fastenings in the form of small nails are dropped by hand into the openings 52 which receive the drivers 48. Then as the plate 50 is depressed with each layer forced into the die, the fastenings which remain stationary are forced into the lifts securing them together. The plate 50 is preferably carried at the upper end of a sliding post 54 mounted in the support 10 and projecting up into the die substantially centrally thereof, the purpose of the construction being to enable the operator to lift the plate 50 when a heel section has been completed in order to eject the same from the die. Movement of the post 54 and thus of the plate 50 to eject the section from the die may be accomplished by various means, that shown comprising a lever 56 pivoted at 58 in the table 14 and being provided with a projecting portion 60 to contact with the lower end of the post 54. When it is desired to force the plate 50 upwardly to lift the heel or heel section from the die it is necessary only to strike a blow upon the outer end of the lever 56, thus returning the plate 50 to its initial position. Means is provided for indicating the thickness of the lifts and, therefore, also, of the heel section at various stages in the making, the said means comprising, in the construction shown, a pointer 62 arranged with its point opposite a plate 64 provided with a scale which indicates the thickness of the lifts in eighths of an inch. For operating the pointer, connections are provided between the pointer and the post 54 which carries the plate 50, the said connections comprising a lever 66 pivoted to the lower end of the post 54 and connected by a link 68 to an arm 70 connected to or integral with the pointer 62. It will be clear from inspection of Fig. 2 of the drawings that as the plate 50 is forced downwardly step by step with each addition of a lift the pointer 62 will be moved a distance corresponding to the thickness of the lift and that the combined thickness of the lifts in the die at any time is indicated by the pointer in connection with the scale on the plate 64. This latter mechanism, together with the lift attaching mechanism, is not my invention but is claimed in the co-pending application of J. H. Pope, Serial No. 259,044, filed Oct. 21, 1918.

The cutter block 8, as stated above, is mounted for movement into co-operative relation with any one of the cutters on the support 10. Preferably the cutter block is pivotally mounted at the end of a relatively long arm so as to be readily movable into the desired position and so that the angle of inclination of the various cutters with respect to each other is slight. Means is provided also for moving the cutter block toward the selected cutter in cutting operations upon stock, the supporting and operating means for the cutter block comprising preferably the post 72 which is vertically reciprocable in the supporting frame by power means comprising shaft 73. Carried by the post 72 is a member 78 having a projection 80 extending upwardly and laterally so as to overhang the support for the cutters. Means is provided for preventing swinging movement of the member 78 on the post comprising preferably a link 79 pivoted to an extension 75 on the upper portion of the frame and to the upper bearing 77 of the member 78, one of the pivots being in a slot to permit of the downward movement of the member 78. Pivoted at 82 in the projection 80 is a rod 84 designed to carry the cutter block 8 at its lower end. Conveniently the cutter block is mounted for rotation on the lower end of its supporting rod so as to present constantly different cutting surfaces to the cutters, thus adding to the life of the block. Means is preferably provided for turning the block automatically, the said means comprising a spring pressed plunger 86 of fiber or of rubber located in an inclined socket and arranged to engage a peripheral portion of the upper surface of the cylindrical block and operative to turn the block as it rises after each cutting operation. For convenience in moving the cutter block there is provided a handle 88 on the rod 84, the said handle serving the further purpose of a manually operable member for controlling the starting mechanism of the machine, the arrangement being such that after the cutter block has been moved into position above the selected cutter by the operator grasping the handle 88, a downward movement of the handle will operate the starting mechanism. In the construction shown the starting mechanism is of the type disclosed in Patent No. 921,503, granted to Arthur Bates on May 11, 1909, and comprises a lever 90 pivoted at 92 on the frame of the machine and connected by means (not shown) to the clutch operating devices on the main shaft. Conveniently the forward end 94 of the lever is provided with a slot 96 through which is passed the rod 84 and in which the handle 88 is slidably engaged, the upper end of the handle being provided with a collar portion 98 so that upon depression of the handle the lever is carried downwardly therewith, thus operating the starting mechanism. To assist the operator in locating the cutter block directly over the selected cutter there is provided means for this purpose comprising preferably a holding device mounted on the lever 90, and comprising, in the construction shown, spring members 100 secured to opposite sides of the slot 96 and having spring projections 102 located in the slot and projecting toward each other from opposite sides of the slot and so arranged as to aline the cutter block with the desired cutter and provide holding means yieldingly to retain the bar 84 in any one of a plurality of positions along the slot in the lever. In the illustrative construction, the holding or retaining devices are operative also to hold the cutter block entirely at one side of the cutters, the manner of operation being to move the cutter block first over the straight edge cutter to straight edge a piece of stock and then over the other cutter or die to force the stock into the die as a step in the manufacture of a heel lift or a heel lift section. Usually one pressure applying operation of the cutter block in cooperation with each cutter is sufficient, it being clear that the operation may be repeated at the will of the operator.

Having described my invention, what I claim as new and desire to secure by Letters Patent of the United States is:

1. In a machine of the class described, a cutter, a co-operating presser member, power means for causing relative movement of the presser member and cutter, starting mechanism for controlling said power means, a support for the presser member pivoted to swing freely about a horizontal axis and under direct manual control of the operator, and means for yieldingly retaining the presser member in operative position over the cutter.

2. In a machine of the class described, a cutter, a presser member for co-operating with said cutter in cutting sheet material and manually movable into and out of operative position, power means comprising a vertically reciprocable post for causing relative movement between the cutter and presser member, starting mechanism for controlling said power means, and means for alining the presser member in operative position above the cutter.

3. In a machine of the class described, a cutter, a presser member freely movable, under direct manual control into and out of position above the cutter, power means for causing relative pressure applying movements of the presser member and cutter, starting mechanism for controlling the power means, and means for yieldingly retaining the presser member in inoperative position at one side of the cutter.

4. In a machine of the class described, a cutter, a cutter block for co-operation with the cutter, power means comprising a vertically reciprocable post for causing relative movement of the cutter and cutter block, means connected to the post for pivotally supporting and guiding the cutter block so that it may be moved manually along the arc of a circle into various positions selected by the operator and into and out of position over the cutter, and means for yieldingly retaining the cutter block in position over said cutter.

5. In a machine of the class described, a support, cutters mounted on the support, a cutter block, power means comprising a vertically movable post for operating said cutter block, starting mechanism comprising a lever for controlling said power means, a support for the cutter block, said lever having a slot in its operating end, and means mounted on the support for the cutter block and adjustable to predetermined stations along said slot in the lever for causing actuation of said lever in different positions of the cutter block over the cutters.

6. In a machine of the class described, a support, cutters mounted on the support, a cutter block, means for supporting the block in such manner that it is movable into position to co-operate with any one of said cutters, power means for moving the cutter block toward and from the cutters in cutting operations, starting mechanism for controlling said power means comprising a member having a slot therein through which the supporting means for the cutter block is arranged to pass, and means for retaining the support for the cutter block in selected position intermediate of the ends of said slot and in or out of position to co-operate with said cutters.

7. In a machine of the class described, a support, cutters mounted on the support, a cutter block for co-operation with any one of said cutters, power means for operating said cutter block comprising a vertically reciprocable post, a member mounted on said post and having an upwardly extending projection, means pivoted to said projection for supporting the cutter block in such manner that the latter may be moved into co-operative relation with any one of said cutters, and means for guiding said cutter block to different predetermined stations during pivotal movement thereof.

8. In a machine of the class described, a cutter, a gage located closely adjacent to said cutter for positioning the work with respect thereto, means for pivotally supporting said gage so that the latter may be moved downwardly as the work is forced upon the cutting edge, and a yielding support for the work mounted closely adjacent to the other side of the cutter.

9. In a machine of the class described, a cutter, a gage mounted closely adjacent to the central portion only of a cutting edge of the cutter so that work may be gaged from a relatively small part of the edge portion of the work, and means for yieldingly supporting said gage, the construction and arrangement being such that work may be positioned for cutting either against the gaging edge of the gage or on top thereof.

10. In a machine of the class described, a straight-edged cutter, a gage located closely adjacent to said cutter for positioning the work with respect thereto, means for yieldingly supporting said gage so that the latter may be moved downwardly as the work is forced upon the cutting edge, and a yielding support for the work mounted independently of the gage and adjacent to the other side of the cutter.

11. In a machine of the class described, a cutter for straight-edging work, a gage mounted closely adjacent to the central portion only of the cutter edge, and means for yieldingly supporting said gage, the construction and arrangement being such that portions of the work may project over the cutter and beyond the plane of the gage while the work is positioned through gaging operation on a relatively small central portion of an edge of the work.

12. In a machine of the class described, a cutter for straight-edging work, and a gage mounted closely adjacent to and intermediate between the ends of the straight edge of the cutter and operative to engage the work by contact with a relatively small part of an edge portion thereof in such manner that other portions of the work may extend beyond the cutting means and beyond the gage.

13. In a machine of the class described, a plurality of cutters, a presser member for co-operating selectively with the cutters in cutting sheet material and manually movable into and out of operative position with respect to the selected cutter, power means for causing relative movement between the cutter and the presser member to effect a cutting operation, starting mechanism for controlling said power means, and means for aligning the presser member in operative position above each individual cutter.

In testimony whereof I have signed my name to this specification.

JOHN B. HADAWAY.